United States Patent [19]
Fukuda et al.

[11] Patent Number: 5,446,098
[45] Date of Patent: Aug. 29, 1995

[54] COVULCANIZABLE RUBBER COMPOSITION OF PARTIALLY HYDROGENATED NITRILE RUBBER AND CHLORINATED ETHYLENE-PROPYLENE COPOLYMER

[75] Inventors: Hideo Fukuda, Yokohama; Haruhiko Fujita, Yokosuka; Hideyoshi Shimoda, Kamakura; Shiryu You, Yokohama, all of Japan

[73] Assignee: Nippon Zeon Co., Ltd., Tokyo, Japan

[21] Appl. No.: 952,826

[22] PCT Filed: Mar. 27, 1992

[86] PCT No.: PCT/JP92/00386
§ 371 Date: Jan. 27, 1993
§ 102(e) Date: Jan. 27, 1993

[87] PCT Pub. No.: WO92/17542
PCT Pub. Date: Oct. 15, 1992

[30] Foreign Application Priority Data
Mar. 30, 1991 [JP] Japan .................. 3-92714

[51] Int. Cl.6 .................. C08L 23/16; C08L 23/28; C08L 33/20
[52] U.S. Cl. .................. 525/194; 525/210; 525/211; 525/216; 525/218; 525/233; 525/234; 525/238

[58] Field of Search .......... 525/194, 195, 213, 215, 525/331.7, 331.9, 332.3, 332.5, 210, 211, 216, 218, 238

[56] References Cited

U.S. PATENT DOCUMENTS

| | | | |
|---|---|---|---|
| 3,936,430 | 2/1976 | Schoen et al. | 525/331.7 |
| 4,048,261 | 9/1977 | Starmer | 525/195 |
| 4,959,420 | 9/1990 | Davis et al. | 525/331.7 |
| 4,963,621 | 10/1990 | Szentivanyi et al. | 525/194 |
| 5,032,454 | 7/1991 | Oyama et al. | 428/392 |
| 5,187,232 | 2/1993 | Musch et al. | 525/215 |

FOREIGN PATENT DOCUMENTS

59-71345 4/1984 Japan.

*Primary Examiner*—James J. Seidleck
*Assistant Examiner*—M. L. Warzel
*Attorney, Agent, or Firm*—Armstrong, Westerman, Hattori, McLeland & Naughton

[57] ABSTRACT

A covulcanizable rubber composition including a partially hydrogenated unsaturated nitrile-conjugated diene copolymer having an iodine value not larger than 120, a chlorinated ethylene-propylene copolymer and a vulcanizer. The composition exhibits an improved processing property when mixed, and provides a vulcanized rubber having an improved constant-elongation fatigue resistance.

6 Claims, 1 Drawing Sheet

COVULCANIZABLE RUBBER COMPOSITION OF PARTIALLY HYDROGENATED NITRILE RUBBER AND CHLORINATED ETHYLENE-PROPYLENE COPOLYMER

TECHNICAL FIELD

This invention relates to a covulcanizable rubber composition comprising a partially hydrogenated unsaturated nitrile-conjugated diene copolymer, a chlorinated ethylene-propylene copolymer and a vulcanizer.

BACKGROUND ART

A partially hydrogenated unsaturated nitrile-conjugated diene copolymer is well known as a rubber having good heat-aging resistance, oil resistance and rancid gasoline resistance. To utilize these good characteristics and impart other characteristics to this rubber, proposals have heretofore been made wherein the copolymer is blended with other rubbers. Among the rubber blends, a blend thereof with an ethylene-propylene-diene copolymer (hereinafter abbreviated to "EPDM") is well known as a rubber composition having good heat-aging resistance, oil resistance and ozone resistance (Japanese Unexamined Patent Publication No. 58-40332, 61-40342, 61-283639 and 62-190241). However, the partially hydrogenated unsaturated nitrile-conjugated diene copolymer rubber and EPDM have greatly different solubility parameters and hence, when mixed together, it is almost impossible that they form a uniformly dispersed mixture. Further, these copolymer rubbers exhibit different rates of vulcanization. Therefore, properties of a vulcanized rubber from the composition of these copolymer rubbers are restricted. Especially, the constant-elongation fatigue properties are not satisfactory.

BRIEF SUMMARY OF THE INVENTION

An object of the invention is to overcome the above-mentioned defects of the conventional rubber compositions and to provide a covulcanizable rubber composition comprising a partially hydrogenated unsaturated nitrile-conjugated diene copolymer, which is characterized as exhibiting an improved processing property when mixed, and as providing a vulcanized rubber having a drastically improved constant-elongation fatigue properties.

In accordance with the present invention, there is provided a covulcanizable rubber composition comprising a partially hydrogenated unsaturated nitrile-conjugated diene copolymer having an iodine value not larger than 120, a chlorinated ethylene-propylene copolymer and a vulcanizer.

BEST MODE FOR CARRYING OUT THE INVENTION

Figure 1:
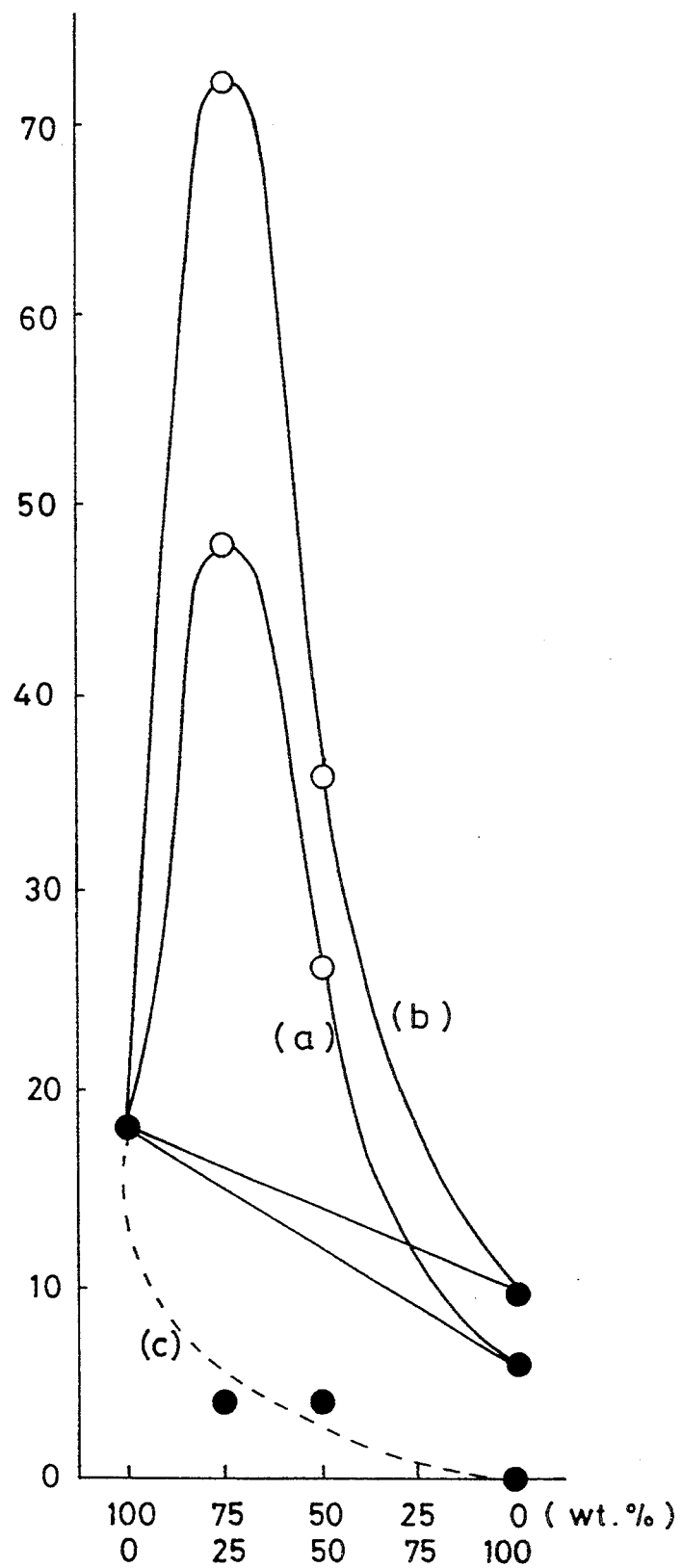
FIG. 1 is a graph showing a relationship of the composition of the copolymer rubber with the number of times at which the rubber sample is broken when the constant-elongation fatigue properties are tested.

The partially hydrogenated unsaturated nitrile-conjugated diene copolymer rubber is prepared by partially hydrogenating conjugated diene units of an unsaturated nitrile-conjugated diene copolymer rubber by a conventional method (for example, a method described in Japanese Examined Patent Publication No. 60-58242 and 62-61045), the latter copolymer rubber being prepared, for example, by an emulsion polymerization or solution polymerization procedure.

As specific examples of the unsaturated nitrile, there can be mentioned acrylonitrile and methacrylonitrile. As specific examples of the conjugated diene, there can be mentioned 1,3-butadiene, 2,3-dimethylbutadiene, isoprene and 1,3-pentadiene. If desired, the unsaturated nitrile and the conjugated diene are copolymerized with other copolymerizable ethylenically unsatureated monomers. As specific examples of the copolymerizable monomers, there can be mentioned unsaturated carboxylic acids such as acrylic acid, methacrylic acid, itaconic acid and maleic acid, and salts thereof, alkyl esters of unsaturated carboxylic acids such as methyl acrylate and butyl acrylate, alkoxyalkyl esters of unsaturated carboxylic acids such as methoxy acrylate, ethoxyethyl acrylate, methoxyethyl acrylate, acrylamide, methacrylamide, N-substituted acrylamides such as N-methylolacrylamide, N,N'-dimethylolacrylamide and N-ethoxymethylacrylamide, and N-substituted methacrylamides such as N-methylolmethacrylamide, N,N'-dimethylolmethacrylamide and N-ethoxymethylmethacrylamide. Provided that the purport of the invention is not injured, the copolymerizable ethylenically unsaturated monomers can be partially substituted by non-conjugated dienes such as vinylnorbornene, dicyclopentadiene and 1,4-hexadiene.

As specific examples of the partially hydrogenated unsaturated nitrile-conjugated diene copolymer rubber used in the invention, there can be mentioned hydrogenated products of a butadiene-acrylonitrile copolymer rubber (hereinafter abbreviated to "NBR"), an isoprene-butadiene-acrylonitrile copolymer rubber and an isoprene-acrylonitrile copolymer rubber, and hydrogenated products of a butadiene-methyl acrylate-acrylonitrile copolymer rubber and a butadiene-acrylic acid-acrylonitrile copolymer rubber.

The content of the bound unsaturated nitrile in the unsaturated nitrile-conjugated diene copolymer rubber is usually 5 to 60% by weight, preferably 10 to 50% by weight for the desired oil resistance.

The iodine value of the partially hydrogenated unsaturated nitrile-conjugated diene rubber is not larger than 120, preferably not larger than 80. If the iodine value exceeds 120, the thermal resistance is reduced and, when mixed together with the chlorinated ethylene-propylene copolymer, the processability is lowered.

The chlorinated ethylene-propylene copolymer used in the invention is prepared by adding chlorine to a copolymer rubber obtained by copolymerization of a combination of ethylene with propylene (the ratio of ethylene to propylene is from 90/10 to 20/80 by weight) or this combination plus non-conjugated diene. Namely, the chlorinated ethylene-propylene copolymer includes the following two types: a product prepared by adding chlorine partially to an ethylene-propylene bipolymer (EPM) and a product prepared by adding chlorine partially to an ethylene-propylene-non-conjugated diene terpolymer (EPDM). The amount of the non-conjugated diene optionally used is preferably such that the iodine value of the resulting EPDM is in the range of 3 to 35. As the specific examples of the non-conjugated diene, there can be mentioned dicyclopentadiene, methyltetrahydroindene, methylene-norbornene, ethylidene-norbornene and 1,4-hexadiene. Of these, ethylidene-norbornene and dicyclopentadiene are preferable in the invention.

The amounts of the partially hydrogenated unsaturated nitrile-conjugated diene copolymer rubber and the chlorinated ethylene-propylene copolymer rubber are 95 to 5% by weight and 5 to 95% by weight, respectively, based on the weight of the sum of the two copolymer rubbers. More preferable amounts of the partially hydrogenated unsaturated nitrile-conjugated diene copolymer rubber and the chlorinated ethylene-propylene copolymer rubber are 90 to 40% by weight and 10 to 60% by weight, respectively. The optimum proportion of the two copolymer rubbers can be determined depending upon the intended use of the rubber composition.

Provided that the object of the invention can be achieved, the rubber composition of the invention may have further incorporated therein conjugated diene rubbers or other rubbers. Among the conjugated diene rubbers, an ethylene-propylene-conjugated diene terpolymer (EPDM) is most preferable in view of the balanced physical properties. The amount of the conjugated diene rubber optionally added is preferably not larger than 35 parts by weight per 100 parts by weight of the sum of the partially hydrogenated unsaturated nitrile-conjugated diene copolymer rubber, the chlorinated ethylene-propylene copolymer rubber and the conjugated diene rubber.

The vulcanizable rubber composition of the invention is prepared by blending the above-mentioned two copolymer rubbers, a vulcanizer and a vulcanizing accelerator, and optional additives such as a filler, for example, carbon black or silica, a reinforcer, a plasticizer and an aging stabilizer by using a mixer such as a roll or a Banbury mixer.

The vulcanizer used is not particularly limited, but is preferably a peroxide type vulcanizer which is a common vulcanizer to the above-mentioned two copolymer rubbers. As specific examples of the common peroxide vulcanizers, there can be mentioned di-t-butylperoxide, t-butylcumylperoxide, dicumylperoxide, 2,5-dimethyl-2,5-di(t-butylperoxy)-hexane, 2,5-dimethyl-2,5-di-(t-butyl-peroxy)-hexyne-3, 1,3-bis-(t-butylperoxy-isopropyl)benzene, 1,1-di-t-butylperoxycyclohexane, t-butyl perbenzoate and t-butylperoxy-isopropyl carbonate. The amount of the vulcanizer in the rubber composition of the invention is preferably 1 to 10% by weight based on the weight of the rubber composition.

The rubber composition of the invention will now be specifically described by the following examples.

The constant-elongation fatigue performance was evaluated as follows. A vulcanized sheet having a thickness of 2 mm was cut into a dumbbell sample of JIS No. 3. The sample was set to a de Mattia flexing machine (supplied by Ueshima Seisakusho K.K.) so that the gripping end of the sample was capable of moving until the sample was drawn to the maximum length of 190% based on the original length (i.e., the maximum elongation was 90%). The cycle of drawing and shrinking was repeated at room temperature and the number of times at which the sample was broken was counted. This test was repeated on ten samples and the constant-elongation fatigue performance was expressed by the average number of times at break.

EXAMPLES 1 TO 4 AND COMPARATIVE EXAMPLES 1 TO 6

Using a hydrogenated acrylonitrile-butadiene copolymer rubber (NBR) having a bound acrylonitrile content of 36% by weight, a chlorinated EPDM having a chlorine content of 36% by weight, a chlorinated EPM having a chlorine content of 36% and EPDM containing no chlorine, rubber compositions were prepared according to the recipes shown in Table 1. Each rubber composition was press-vulcanized under the vulcanizing conditions shown in Table 1 to prepare a vulcanized sheet having a thickness of 2 mm. The physical properties of this vulcanized sheet were determined according to JIS K-6301. The results are shown in Table 1. The data of the constant-elongation fatigue performance were shown in FIG. 1. In FIG. 1, the ordinate indicates the number of times (the unit number of times is 1,000) at which the sample was broken when it was subjected to a cycle of drawing and shrinking in the flexing machine. The abscissa indicates the composition of the copolymer rubbers wherein the upper line of numerals is the amount of hydrogenated NBR and the lower line of numerals is the amount of EPDM, chlorinated EPDM or chlorinated EPM. White spots are examples of the invention and black spots are comparative examples. Curves (a), (b) and (c) correspond to chlorinated EPDM, chlorinated EPM and EPDM, respectively.

TABLE 1

| | Comparative Examples | | | | | | Parts by weight Examples | | | |
|---|---|---|---|---|---|---|---|---|---|---|
| | 1 | 2 | 3 | 4 | 5 | 6 | 1 | 2 | 3 | 4 |
| H-NBR *1 | 100 | 75 | 50 | — | — | — | 75 | 50 | 75 | 50 |
| EPDM *2 | — | 25 | 50 | 100 | — | — | — | — | — | — |
| Cl-EPDM *3 | — | — | — | — | 100 | — | 25 | 50 | — | — |
| Cl-EPM *4 | — | — | — | — | — | 100 | — | — | 25 | 50 |
| FEF carbon 7 | 50 | 50 | 50 | 50 | 50 | 50 | 50 | 50 | 50 | 50 |
| Plasticizer *5 | 5 | 5 | 5 | 5 | 5 | 5 | 5 | 5 | 5 | 5 |
| TMPT *6 | 2 | 2 | 2 | 2 | 2 | 2 | 2 | 2 | 2 | 2 |
| Vulcanizer *7 | 6 | 6 | 6 | 6 | 6 | 6 | 6 | 6 | 6 | 6 |
| Total weight | 163 | 163 | 163 | 163 | 163 | 163 | 163 | 163 | 163 | 163 |
| Physical properties in normal state *16 | | | | | | | | | | |
| $TB_B$ (kgf/cm$^2$) | 284 | 255 | 204 | 149 | 279 | 285 | 289 | 267 | 295 | 270 |
| $E_B$ (%) | 280 | 240 | 180 | 130 | 240 | 260 | 280 | 240 | 300 | 250 |
| $M_{100}$ (kgf/cm$^2$) | 77 | 89 | 100 | 102 | 106 | 101 | 83 | 92 | 79 | 89 |
| $M_{200}$ (kgf/cm$^2$) | 204 | 219 | — | — | 242 | 235 | 212 | 224 | 204 | 220 |
| Hs (JIS) | 75 | 76 | 76 | 74 | 81 | 80 | 76 | 77 | 74 | 76 |

TABLE 1-continued

|  | Comparative Examples | | | | | | Parts by weight Examples | | | |
| --- | --- | --- | --- | --- | --- | --- | --- | --- | --- | --- |
|  | 1 | 2 | 3 | 4 | 5 | 6 | 1 | 2 | 3 | 4 |
| Fatigue (× 1000) *8 | 17.5 | 4.5 | 3.1 | 0.4 | 6.5 | 9.8 | 47.5 | 25.5 | 73.6 | 37.0 |

Note
*1 Hydrogenated NBR having an acrylonitrile content of 36% by weight and an iodine value of 4 (Zetpol 2000 supplied by Nippon Zeon Co.
*2 Ethylene-propylene-dicyclopentadiene terpolymer
*3 Chlorinated ethylene-propylene-dicyclopentadiene terpolymer having a chlorine content of 36% by weight
*4 Chlorinated ethylene-propylene bipolymer having a chlorine content of 36% by weight
*5 Trimellitic acid ester plasticizer C-9N supplied by Adeca-Argus Co.
*6 Trimethylolpropane trimethacrylate
*7 1,3-bis(t-butylperoxyisopropyl)benzene, Peroxymon F-40
*8 Constant-elongation fatigue performance, number of times at which sample was broken when tested at room temperature and at an repeated elongation ranging from zero to 90%
*16 Primary vulcanization at 165° C. for 30 minutes and secondary vulcanization at 150° C. for 4 hours As seen from the constant-elongation fatigue performance shown in Table 1, the vulcanized product of the rubber composition of the invention exhibits an excellent performance which is superior to the sum of hydrogenated NBR plus chlorinated EPDM, chlorinated EPM or EPDM. This fact will be more clearly seen from FIG. 1.

drogenated NBR, chlorinated EPDM, chlorinated EPM and EPDM, as those in used in Example wherein the recipes were changed as shown in Table 2. Each vulcanized product was press-vulcanized under the conditions shown in Table 3 to prepare a vulcanized sheet having a thickness of 2 mm. The physical properties of the vulcanized sheet were evaluated according to JIS K-6301. The results are shown in Table 3.

TABLE 2

|  | Comp. Ex. | | Examples | | | | | |
| --- | --- | --- | --- | --- | --- | --- | --- | --- |
|  | 7 | 8 | 5 | 6 | 7 | 8 | 9 | 10 |
| H-NBR | 100 | 70 | 70 | 70 | 70 | 70 | 70 | 70 |
| EPDM | — | 30 | 22.5 | 15 | — | 22.5 | 15 | — |
| Cl-EPDM | — | — | 7.5 | 15 | 30 | — | — | — |
| Cl-EPM | — | — | — | — | — | 7.5 | 15 | 30 |
| FT carbon | 200 | 200 | 200 | 200 | 200 | 200 | 200 | 200 |
| Plasticizer *9 | 30 | 30 | 30 | 30 | 30 | 30 | 30 | 30 |
| Plasticizer *10 | 30 | 40 | 40 | 40 | 40 | 40 | 40 | 40 |
| Aging stabilizer *11 | 2 | 2 | 2 | 2 | 2 | 2 | 2 | 2 |
| Aging stabilizer *12 | 2 | 2 | 2 | 2 | 2 | 2 | 2 | 2 |
| TAIC *13 | 2 | 2 | 2 | 2 | 2 | 2 | 2 | 2 |
| Vulcanizer *14 | 3.2 | 3.2 | 3.2 | 3.2 | 3.2 | 3.2 | 3.2 | 3.2 |

Note
*9 Adipic acid ester plasticizer, Polycyzar-W 4000, supplied by Dai-nippon Ink and Chemical Co.
*10 Trimellitic acid ester plasticizer, supplied by Adeca-Argus Co.
*11 Aging stabilizer A0455
*12 Aging stabilizer A0224
*13 Triallyl isocyanurate
*14 1,3-Bis(t-butylperoxyisopropyl)benzene

EXAMPLES 5 TO 10 AND COMPARATIVE EXAMPLES 7 AND 8

Following the same procedures as in Example 1, vulcanized products were prepared from the same hy-

TABLE 3

|  | Comp. Ex. | | Example | | | | | |
| --- | --- | --- | --- | --- | --- | --- | --- | --- |
|  | 7 | 8 | 5 | 6 | 7 | 8 | 9 | 10 |
| Surface texture of vulcanized sheet *1 | G | B | G | G | G | G | G | G |
| Physical properties in normal state *2 | | | | | | | | |
| $T_B$ (kgf/cm$^2$) | 141 | 89 | 118 | 117 | 112 | 121 | 119 | 115 |
| $E_B$ (%) | 250 | 160 | 230 | 240 | 240 | 240 | 250 | 260 |
| $M_{100}$ (kgf/cm$^2$) | 36 | 56 | 41 | 37 | 36 | 39 | 35 | 37 |
| $M_{200}$ (kgf/cm$^2$) | 114 | — | 110 | 99 | 95 | 105 | 96 | 93 |
| Hs (JIS) | 70 | 76 | 72 | 74 | 73 | 72 | 73 | 73 |
| Heat-aging properties *3 | | | | | | | | |
| $\Delta T_B$ (%) | −7 | −2 | −8 | −7 | −7 | −9 | −7 | −6 |
| $\Delta E_B$ (%) | −8 | −6 | −10 | −8 | −8 | −8 | −8 | −8 |
| $\Delta H_S$ (point) | +6 | +5 | +5 | +4 | +4 | +4 | +5 | +5 |
| Heat-aging properties *4 | | | | | | | | |
| $\Delta T_B$ (%) | −4 | −2 | −8 | −8 | −2 | −10 | −12 | −13 |
| $\Delta E_B$ (%) | −36 | −25 | −40 | −42 | −50 | −42 | −44 | −54 |
| $\Delta H_S$ (point) | +13 | +10 | +12 | +10 | +13 | +13 | +13 | +14 |
| Compression set | | | | | | | | |
| 150° C. × 70h (%) | 34 | 33 | 44 | 53 | 61 | 47 | 55 | 63 |
| 175° C. × 70h (%) | 47 | 49 | 64 | 77 | 92 | 66 | 80 | 95 |
| Cold resistance (brittle temperature) | | | | | | | | |
| Tb (°C.) | −27 | −26 | −27 | −26 | −26 | −27 | −26 | −25 |
| Oil resistance *5 | | | | | | | | |

TABLE 3-continued

|  | Comp. Ex. | | Example | | | | | |
| --- | --- | --- | --- | --- | --- | --- | --- | --- |
|  | 7 | 8 | 5 | 6 | 7 | 8 | 9 | 10 |
| ΔV (%) | +4 | +27 | +30 | +31 | +34 | +31 | +33 | +36 |
| ΔT$_B$ (%) | −6 | −3 | −15 | −32 | −61 | −16 | −34 | −62 |
| ΔE$_B$ (%) | −24 | −19 | −26 | −37 | −50 | −25 | −40 | −54 |
| ΔH$_s$ (point) | +3 | +1 | −10 | −15 | −20 | −10 | −16 | −22 |
| Oil resitance *6 | | | | | | | | |
| ΔV (%) | −6 | +14 | +13 | +11 | +8 | +12 | +13 | +10 |
| ΔT$_B$ (%) | −7 | −12 | −19 | −22 | −35 | −20 | −24 | −26 |
| ΔE$_B$ (%) | −24 | −19 | −22 | −33 | −42 | −21 | −24 | −38 |
| ΔH$_s$ (point) | +9 | −1 | −1 | −3 | −4 | −1 | −2 | −3 |
| Constant-elongation fatigue perfomance | | | | | | | | |
| (no. of times, × 1000) | 16.5 | 4.2 | 18.5 | 25.5 | 43.5 | 23.1 | 31.1 | 52.2 |

Note
*1 G: Good P: Granular structure is found which seems to be EPDM
*2 Physical properties as measured in normal state after a primary vulcanization at 170° C. for 20 minutes and a secondary vulcanization at 150° C. for 4 hours
*3 Heat-aging resistance as measured after maintained at 150° C. for 70 hours
*4 Heat-aging resistance as measured after maintained at 175° C. for 70 hours
*5 Weight increase as measured after immersion in JIS #3 oil at 150° C. for 70 hours
*6 Weight increase as measured after immersion in power steering oil (Mazda power steering oil, genuine PSF M.III) at 150° C. for 70 hours As seen from Table 3, the vulcanizable rubber composition of the invention exhibits a drastically improved constant-elongation fatigue performance, as well as thermal resistance and oil resistance which are comparable with that of a conventional blend of hydrogenated NBR with EPDM.

Industrial Applicability

Vulcanized products obtained from the rubber composition of the invention has balanced thermal resistance, cold resistance and oil resistance and a very enhanced constant-elongation fatigue performance. Therefore, the rubber composition is used widely for the production of various hoses and vibration insulators.

We claim:

1. A covulcanizable rubber composition comprising a mixture of 90 to 40% by weight of a partially hydrogenated unsaturated nitrile-conjugated diene copolymer having an iodine value not larger than 80 and 10 to 60% by weight of a chlorinated ethylene-propylene copolymer consisting of ethylene and propylene, based on the total weight of the two copolymers, and a vulcanizer.

2. The composition according to claim 1 wherein the amount of bound unsaturated nitrile in the partially hydrogenated nitrile-conjugated diene is 5 to 60% by weight.

3. The composition according to claim 1 wherein the chlorinated ethylene-propylene copolymer is a chlorinated product of a bipolymer derived from 20 to 90% by weight of ethylene and 80 to 10% by weight of propylene.

4. The composition according to claim 1 wherein the composition further comprises a chlorinated product of a terpolymer derived from 20 to 90% by weight of ethylene, 80 to 10% by weight of propylene and non-conjugated diene and having an iodine value of 3 to 35.

5. The composition according to claim 1 wherein the rubber composition comprises, in addition to the partially hydrogenated nitrile-conjugated diene copolymer, the chlorinated ethylene-propylene copolymer and the vulcanizer, not larger than 35 parts by weight, per 100 parts by weight of the total of the partially hydrogenated nitrile-conjugated diene copolymer and the chlorinated ethylene-propylene copolymer, of an ethylene-propylene-conjugated diene terpolymer.

6. The composition according to claim 1 wherein the vulcanizer is an organic peroxide.

* * * * *